United States Patent
Karunakaran et al.

(10) Patent No.: US 12,316,471 B2
(45) Date of Patent: May 27, 2025

(54) DISTRIBUTING MULTICAST RECEIVER INFORMATION ACROSS MULTI-TIER EDGE GATEWAYS

(71) Applicant: VMware LLC, Palo Alto, CA (US)

(72) Inventors: Senthilkumar Karunakaran, Santa Clara, CA (US); Subin Cyriac Mathew, San Jose, CA (US); Chidambareswaran Raman, Sunnyvale, CA (US); Rishi Kanth Alapati, Dublin, CA (US)

(73) Assignee: VMWare LLC, Palo Alto, CA (US)

( * ) Notice: Subject to any disclaimer, the term of this patent is extended or adjusted under 35 U.S.C. 154(b) by 694 days.

(21) Appl. No.: 17/580,311

(22) Filed: Jan. 20, 2022

(65) Prior Publication Data

US 2022/0231875 A1    Jul. 21, 2022

Related U.S. Application Data

(60) Provisional application No. 63/140,223, filed on Jan. 21, 2021.

(51) Int. Cl.
*H04L 12/18* (2006.01)
*H04L 12/46* (2006.01)

(52) U.S. Cl.
CPC ...... *H04L 12/1886* (2013.01); *H04L 12/4633* (2013.01)

(58) Field of Classification Search
CPC .................. H04L 12/1886; H04L 12/4633
USPC ....................................................... 370/390
See application file for complete search history.

(56) References Cited

U.S. PATENT DOCUMENTS

| | | | |
|---|---|---|---|
| 5,079,767 | A | 1/1992 | Perlman |
| 5,128,926 | A | 7/1992 | Perlman et al. |
| 6,154,463 | A | 11/2000 | Aggarwal et al. |
| 7,317,722 | B2 | 1/2008 | Aquino et al. |
| 7,802,000 | B1 | 9/2010 | Huang et al. |

(Continued)

FOREIGN PATENT DOCUMENTS

| | | |
|---|---|---|
| CN | 101102214 A | 1/2008 |
| CN | 101222346 A | 7/2008 |

(Continued)

OTHER PUBLICATIONS

Non-Published Commonly Owned U.S. Appl. No. 18/244,236, filed Sep. 9, 2023, 48 pages, VMware, Inc.

(Continued)

*Primary Examiner* — Gbemileke J Onamuti
(74) *Attorney, Agent, or Firm* — Quarles & Brady LLP

(57) ABSTRACT

Some embodiments provide a method of multicasting data in a segregated logical network with multiple network segments. The network segments each have at least one router. The multicast originates from a multicast source in a first network segment and goes to multicast receivers in several other network segments. In the method, the router of the first network segment receives encoding data for a set of virtual tunnel endpoints (VTEPs) of the receivers. The router then receives the multicast data from the multicast source. For each VTEP, the router then encodes the data for the receiver using the encoding data for the VTEP of the receiver. The router then sends (e.g., as a unicast) the encoded data to a router of the network segment of the receiver. The router performing the method may be a domain router of the network segment of the receiver.

20 Claims, 7 Drawing Sheets

(56) References Cited

U.S. PATENT DOCUMENTS

| | | |
|---|---|---|
| 7,925,778 B1 | 4/2011 | Wijnands et al. |
| 8,111,633 B1 | 2/2012 | Aggarwal et al. |
| 8,537,816 B2 | 9/2013 | Anumala et al. |
| 8,665,887 B2 | 3/2014 | Ge et al. |
| 8,908,686 B1 | 12/2014 | Ghosh |
| 9,043,452 B2 | 5/2015 | Fulton |
| 9,137,045 B2 | 9/2015 | Chen et al. |
| 9,270,585 B2 | 2/2016 | Manion et al. |
| 9,432,204 B2 | 8/2016 | Shen et al. |
| 9,479,348 B2 | 10/2016 | Sreeramoju et al. |
| 9,602,385 B2 | 3/2017 | Tessmer et al. |
| 9,692,655 B2 | 6/2017 | Koponen et al. |
| 9,794,079 B2 | 10/2017 | Tessmer et al. |
| 10,015,643 B2 | 7/2018 | Zuniga et al. |
| 10,198,492 B1 | 2/2019 | O'Neill et al. |
| 10,218,523 B2 | 2/2019 | Boutros et al. |
| 10,263,884 B2 | 4/2019 | Kota et al. |
| 10,454,833 B1 | 10/2019 | Bosshart et al. |
| 10,484,303 B2 | 11/2019 | Shepherd et al. |
| 10,503,565 B2 | 12/2019 | Guo et al. |
| 10,511,548 B2 | 12/2019 | Liu et al. |
| 10,523,455 B2 | 12/2019 | Boutros et al. |
| 10,567,187 B2 | 2/2020 | Mathew et al. |
| 10,873,473 B2 | 12/2020 | Boutros et al. |
| 10,904,134 B2 | 1/2021 | Jiang et al. |
| 10,958,462 B2 | 3/2021 | Boutros et al. |
| 10,979,246 B2 | 4/2021 | Boutros et al. |
| 11,063,872 B2 | 7/2021 | Mathew et al. |
| 11,595,296 B2 | 2/2023 | Selvaraj et al. |
| 2003/0088696 A1 | 5/2003 | McCanne |
| 2003/0152098 A1 | 8/2003 | Zhu |
| 2003/0165140 A1 | 9/2003 | Tang et al. |
| 2004/0258003 A1 | 12/2004 | Kokot et al. |
| 2006/0153219 A1 | 7/2006 | Wong et al. |
| 2007/0104192 A1 | 5/2007 | Yoon et al. |
| 2009/0147786 A1 | 6/2009 | Li et al. |
| 2009/0279701 A1 | 11/2009 | Moisand et al. |
| 2011/0158113 A1 | 6/2011 | Nanda et al. |
| 2011/0211517 A1 | 9/2011 | Moscibroda et al. |
| 2012/0033668 A1 | 2/2012 | Humphries |
| 2013/0044641 A1 | 2/2013 | Koponen et al. |
| 2013/0051399 A1 | 2/2013 | Zhang et al. |
| 2013/0058229 A1 | 3/2013 | Casado et al. |
| 2013/0103817 A1 | 4/2013 | Koponen et al. |
| 2013/0107699 A1 | 5/2013 | Miclea |
| 2013/0107883 A1 | 5/2013 | Ashwood-Smith |
| 2013/0114466 A1 | 5/2013 | Koponen et al. |
| 2013/0117428 A1 | 5/2013 | Koponen et al. |
| 2013/0117429 A1 | 5/2013 | Koponen et al. |
| 2013/0128886 A1 | 5/2013 | Shah |
| 2013/0188521 A1 | 7/2013 | Jain |
| 2013/0287026 A1 | 10/2013 | Davie |
| 2013/0322443 A1 | 12/2013 | Dunbar et al. |
| 2013/0329605 A1 | 12/2013 | Nakil et al. |
| 2014/0003427 A1 | 1/2014 | Nishi et al. |
| 2014/0064142 A1 | 3/2014 | Mylarappa et al. |
| 2014/0098813 A1 | 4/2014 | Mishra et al. |
| 2014/0098815 A1 | 4/2014 | Mishra et al. |
| 2014/0185613 A1 | 7/2014 | Sato |
| 2014/0198661 A1 | 7/2014 | Raman et al. |
| 2014/0223435 A1 | 8/2014 | Chang |
| 2014/0328159 A1 | 11/2014 | Rebella et al. |
| 2015/0009995 A1 | 1/2015 | Gross, IV et al. |
| 2015/0016286 A1 | 1/2015 | Ganichev et al. |
| 2015/0016460 A1 | 1/2015 | Zhang et al. |
| 2015/0016469 A1 | 1/2015 | Ganichev et al. |
| 2015/0055651 A1 | 2/2015 | Shen et al. |
| 2015/0055652 A1 | 2/2015 | Yong et al. |
| 2015/0058968 A1 | 2/2015 | Wang et al. |
| 2015/0063364 A1 | 3/2015 | Thakkar et al. |
| 2015/0103843 A1 | 4/2015 | Chandrashekhar et al. |
| 2015/0139238 A1 | 5/2015 | Pourzandi et al. |
| 2015/0263899 A1 | 9/2015 | Tubaltsev et al. |
| 2015/0281125 A1 | 10/2015 | Koponen et al. |
| 2016/0092257 A1 | 3/2016 | Wang et al. |
| 2016/0092259 A1 | 3/2016 | Mehta et al. |
| 2016/0094365 A1 | 3/2016 | Subramaniyam et al. |
| 2016/0094366 A1 | 3/2016 | Wang et al. |
| 2016/0094396 A1 | 3/2016 | Chandrashekhar et al. |
| 2016/0094398 A1 | 3/2016 | Choudhury et al. |
| 2016/0105333 A1 | 4/2016 | Lenglet et al. |
| 2016/0226671 A1 | 8/2016 | Lemoine |
| 2016/0241410 A1 | 8/2016 | Lemoine |
| 2018/0063193 A1 | 3/2018 | Chandrashekhar et al. |
| 2019/0007342 A1 | 1/2019 | Wang et al. |
| 2019/0020490 A1 | 1/2019 | Boutros et al. |
| 2019/0020491 A1 | 1/2019 | Boutros et al. |
| 2019/0020492 A1 | 1/2019 | Boutros et al. |
| 2019/0028328 A1 | 1/2019 | Tessmer et al. |
| 2019/0158381 A1 | 5/2019 | Beeram et al. |
| 2019/0182061 A1 | 6/2019 | Boutros et al. |
| 2020/0036646 A1 | 1/2020 | Mathew et al. |
| 2020/0067818 A1 | 2/2020 | Jeuk et al. |
| 2020/0067819 A1 | 2/2020 | Basavaraj et al. |
| 2021/0099380 A1 | 4/2021 | Suryanarayana et al. |
| 2021/0099400 A1 | 4/2021 | Elizabeth et al. |
| 2021/0111914 A1 | 4/2021 | Boutros et al. |
| 2021/0126866 A1 | 4/2021 | Mathew et al. |
| 2021/0218587 A1 | 7/2021 | Mishra et al. |
| 2021/0218684 A1 | 7/2021 | Rekhate et al. |
| 2021/0243253 A1 | 8/2021 | Pang et al. |
| 2021/0314263 A1 | 10/2021 | Mathew et al. |
| 2022/0045875 A1 | 2/2022 | Zhou et al. |
| 2022/0417132 A1 | 12/2022 | Selvaraj et al. |
| 2022/0417133 A1 | 12/2022 | Selvaraj et al. |
| 2023/0164067 A1 | 5/2023 | Karunakaran et al. |

FOREIGN PATENT DOCUMENTS

| | | |
|---|---|---|
| CN | 103516542 A | 1/2014 |
| CN | 104243323 A | 12/2014 |
| CN | 104426681 A | 3/2015 |
| CN | 104871483 A | 8/2015 |
| CN | 105684363 A | 6/2016 |
| CN | 106165358 A | 11/2016 |
| CN | 106850878 A | 6/2017 |
| EP | 1876766 A1 | 1/2008 |
| GB | 2529705 A | 3/2016 |
| WO | 2015054671 A2 | 4/2015 |
| WO | 2015142404 A1 | 9/2015 |
| WO | 2019018261 A1 | 1/2019 |
| WO | 2023091336 A1 | 5/2023 |

OTHER PUBLICATIONS

Non-Published Commonly Owned U.S. Appl. No. 17/362,968, filed Jun. 29, 2021, 35 pages, VMware, Inc.
Non-Published Commonly Owned U.S. Appl. No. 17/362,973, filed Jun. 29, 2021, 35 pages, VMware, Inc.
Non-Published Commonly Owned U.S. Appl. No. 17/532,254, filed Nov. 22, 2021, 39 pages, VMware, Inc.

DISTRIBUTING MULTICAST RECEIVER INFORMATION ACROSS MULTI-TIER EDGE GATEWAYS

BACKGROUND

In datacenters and other private or public networks with multiple network segments, a single source virtual machine or other device on one network segment may multicast data streams to multiple receivers in other network segments. In existing segmented networks, the segmented networks have external gateways that act as the gateway between a physical wide area network (WAN) and a virtual (overlay) network. In the prior art, a single active centralized router of the external gateway acts as conduit for all multicast data streams of the virtual network. The centralized router receives the multicast data from a source virtual machine (VM), encapsulates the multicast data into several unicast data streams and sends the encapsulated data to the network segments of each receiver. However, this reliance on a single centralized router for multicast streaming ties up limited bandwidth of the centralized router. Accordingly, there is a need for a multicast system that does not route all multicast data through a single active centralized router.

BRIEF SUMMARY

Some embodiments provide a method of multicasting data in a segregated logical network with multiple network segments. The network segments each have at least one router. The multicast originates from a multicast source in a first network segment and goes to multicast receivers in several other network segments. In the method, the router of the first network segment receives encoding data for a set of virtual tunnel endpoints (VTEPs) of the receivers. The router then receives the multicast data from the multicast source. For each VTEP, the router then encodes the data for the receiver using the encoding data for the VTEP of the receiver. The router then sends the encoded data to a router of the network segment of the receiver. The router performing the method may be a domain router of the network segment of the receiver.

The router in some embodiments receives the encoding data for the set of VTEPs from a second router of a second network segment. The second router may act as an Internet Group Management Protocol (IGMP) querier. The router may receive the encoding data when the second router distributes the encoding data to multiple routers in the network segments. In some embodiments, the second router is a centralized router of an external gateway of the logical network.

The router may receive the encoding data for the VTEPs of the receivers paired with an identifier of a particular multicast. That identifier (paired with the VTEP) of the particular multicast may be a multicast-group-IP address. The multicast source may be a virtual machine of the network segment. In addition to the identifier paired with the VTEP, the router may receive, from the virtual machine, a second identifier of the particular multicast to identify the multicast data as data of the particular multicast. That is, the second identifier alerts the router that the data belongs to that particular multicast rather than belonging to some other multicast or being non-multicast data. In some embodiments, the identifier paired with the VTEP is received before the identifier from the multicast source VM. The router of some embodiments may receive a multicast forwarding information base (MFIB) that identifies a route to each of the receivers. The router may use the MFIB when it sends the encoded data to the router of the network segment of the receiver.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1:
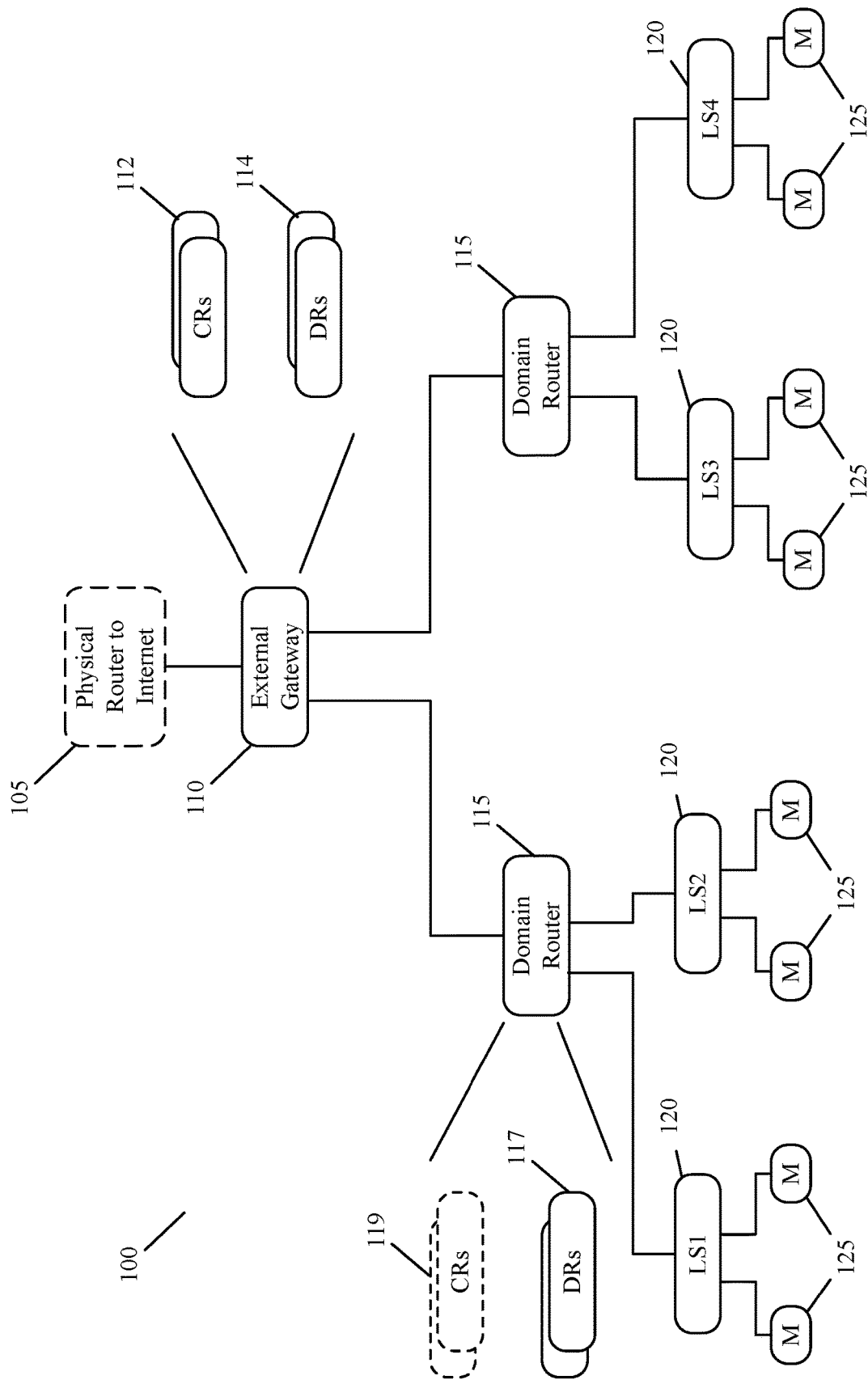
FIG. 1 illustrates a virtual network of some embodiments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method of multicasting data in a segregated logical network with multiple network segments. The network segments each have at least one router. The multicast originates from a multicast source in a first network segment and goes to multicast receivers in several other network segments. In the method, the router of the first network segment receives encoding data for a set of virtual tunnel endpoints (VTEPs) of the receivers. The router then receives the multicast data from the multicast source. For each VTEP, the router then encodes the data for the receiver using the encoding data for the VTEP of the receiver. The router then sends (e.g., as a unicast) the encoded data to a router of the network segment of the receiver. The router performing the method may be a domain router of the network segment of the receiver.

The router in some embodiments receives the encoding data for the set of VTEPs from a second router of a second network segment. The second router may act as an Internet Group Management Protocol (IGMP) querier. The router may receive the encoding data when the second router distributes the encoding data to multiple routers in the network segments. In some embodiments, the second router is a centralized router of an external gateway of the logical network.

The router may receive the encoding data for the VTEPs of the receivers paired with an identifier of a particular multicast. That identifier (paired with the VTEP) of the particular multicast may be a multicast-group-IP address. The multicast source may be a virtual machine of the network segment. In addition to the identifier paired with the VTEP, the router may receive, from the virtual machine, a second identifier of the particular multicast to identify the multicast data as data of the particular multicast. That is, the second identifier alerts the router that the data belongs to that particular multicast rather than belonging to some other multicast or being non-multicast data. In some embodiments, the identifier paired with the VTEP is received before the identifier from the multicast source VM.

The router of some embodiments may receive a multicast forwarding information base (MFIB) that identifies a route to each of the receivers. The router may use the MFIB when it sends the encoded data to the router of the network segment of the receiver.

Each network segment, in some embodiments, is served by (1) an external gateway centralized router (CR) that serves as a gateway between a physical wide area network (WAN) and the segregated logical network, and (2) a domain router that routes data between the external gateway and the network segment. In some such embodiments, the router of the first (source) network segment sends the data to the domain router of the network segment of the receiver. That is, the router of the source network segment sends the encoded data for the domain router of the receiving network segment to decode and forward to a receiving machine (or in some cases multiple receiving machines).

In some cases, the environment in which the method operates includes a second network segment of the logical network with an active router that sends queries (e.g., IGMP queries) identifying available multicasts for machines (e.g., VMs) of the segregated logical network to subscribe to. The active router may then receive reports (e.g., IGMP reports), subscribing VMs to the multicast channel, from one or more VMs of the other network segments. The active router may send data from the reports to a network controller. The data may include VTEP identifiers of the network segments of the subscribing VMs. The network controller may then send, to the router in each of the plurality of the network segments, the encoding data for the set of VTEPs of the receivers. This, in some embodiments, is the source of the VTEP encoding data received by the router of the source network segment.

FIG. 1 illustrates a virtual network 100 of some embodiments. FIG. 1 includes a physical router 105, an external gateway 110, domain routers 115, logical switches (LSs) 120, and machines (e.g., VMs) 125. The external gateway 110 is comprised of a set of centralized routers (CRs) 112 and a set of distributed routers (DRs) 114. The domain routers 115 are each comprised of at least a set of DRs 117 and, in some embodiments, a set of CRs 119.

The virtual network 100 connects to a physical router 105 that connects to a physical network such as the Internet or a physical LAN or WAN (not shown) through the external gateway 110. The external gateway 110 includes multiple CRs 112 that in some embodiments include at least one active CR and multiple standby CRs. The CRs 112 are able to communicate directly with other CRs 112, the physical router 105 and any of the domain routers 115. In some embodiments, the domain routers 115 each service a separate network segment, that includes the logical switches 120 connected to the domain router 115 and the machines 125 connected to those logical switches 120. The separate network segments may be used by different clients, different departments of a single client (e.g., various departments of a company or university), for separate functions by a single department, etc. In some embodiments, each domain router 115 has a separate set of one or more CRs 112 and a separate set of DRs 114 of the external gateway 110 dedicated to that domain router 115. In some embodiments, the CRs 112 are implemented on dedicated hardware of a datacenter (e.g., dedicated servers, physical routers, etc.) while the DRs are implemented on general purpose hosts of the datacenter in addition to or instead of on dedicated hardware.

Figure 2:
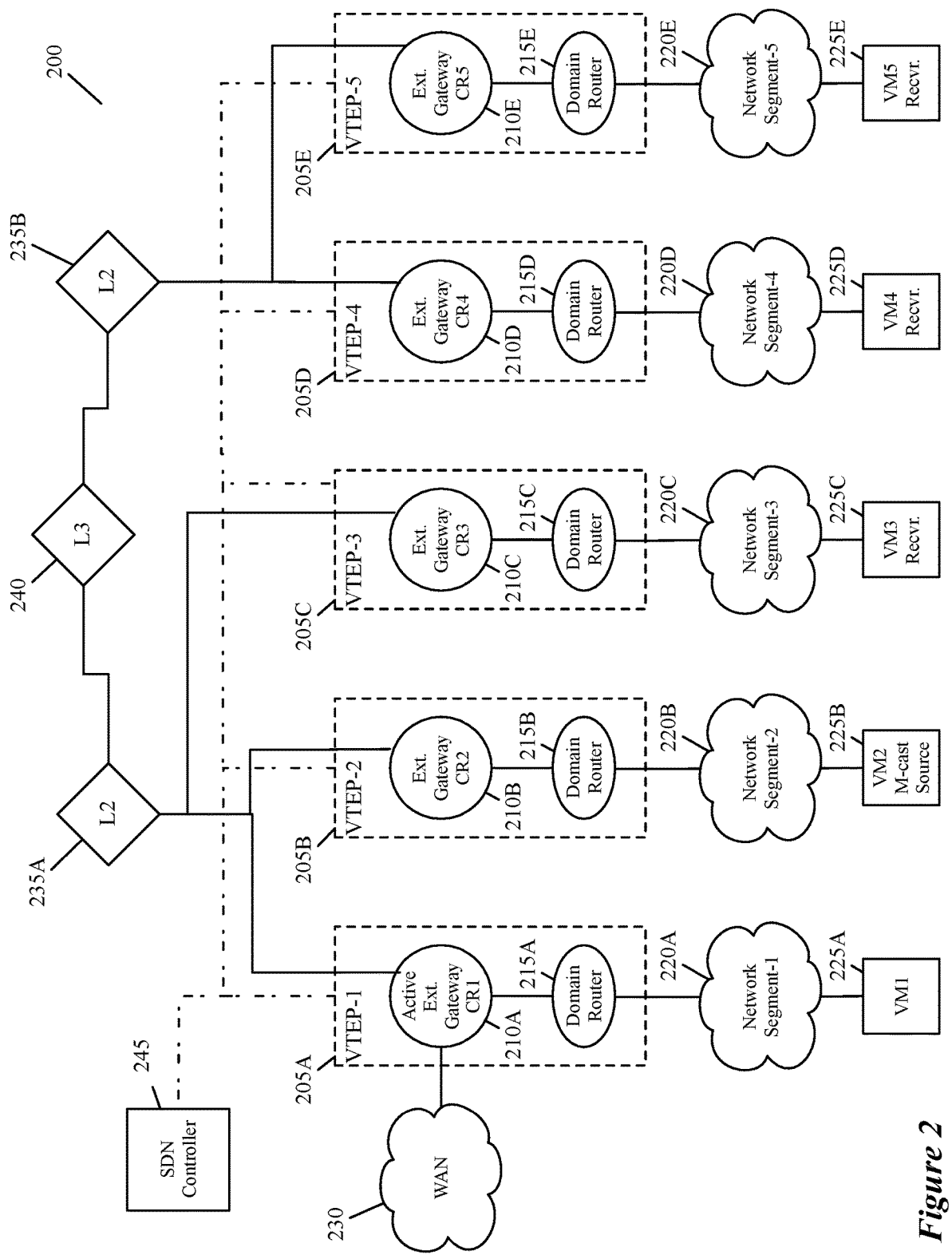
FIG. 2 illustrates a segmented logical network of some embodiments.

The segmented logical network of some embodiments may provide separate segments for each of multiple clients of a datacenter, for multiple departments or applications of the same client, etc. FIG. 2 illustrates a segmented logical network 200 (sometimes called a "virtual" or "overlay" network) of some embodiments. The logical network 200 is controlled by a software defined network (SDN) controller 245. The logical network 200 includes multiple VTEP endpoints 205A-205E. Each VTEP endpoint 205A-205E includes a CR 210A-210E of an external gateway, and a domain router 215A-215E, respectively. The external gateway CRs 210A-210E act as virtual routers between a physical router (not shown) to a physical WAN 230 and the virtual (overlay) network 200. In FIG. 2, the external gateway CR 210A is configured as an active router, while the additional external gateway CRs 210B-210E are configured as standby routers. The domain routers 215A-215E are each comprised of sets of DRs (and in some embodiments CRs) between the external gateway CRs 210A-210E and the network segments 220A-220E. The network segments 220A-220E may include logical switches, DRs, and/or other software routing elements in some embodiments. The network segments 220A-220E each connect to at least one VM. VMs 225A-225E are shown in FIG. 2, however one of ordinary skill in the art will understand that in some embodiments additional VMs may be connected to some or all of the network segments 220A-220E.

The VM 225B is the source of a multicast data stream while the VMs 225C-225E are receivers of the multicast data stream. The external gateway CRs 210A-210C are connected through a first layer 2 (L2) bridge 235A and the external gateway CRs 210D-210E are connected through a second L2 bridge 235B. Each of the L2 bridges 235A-235B enables connectivity between the virtual network 200 and the physical network, WAN 230. Thus enabling virtual machines (VMs) 225A-225E to connect to the WAN 230 through the physical layer 3 (L3) gateway 240.

Although FIG. 2 includes a specific number of network segments, with one VM per network segment, one of ordinary skill in the art will understand that this is merely an example of the number of network segments and virtual machines that a logical network implementing the present invention may use and that in other cases, the method may be employed on logical networks with more or fewer network segments and/or with more or fewer virtual machines in each network segment. Although the illustrated embodiments herein allow both the external gateway and the domain routers to encode and decode virtual tunnel encapsulated data (and thus allows both the external gateways and domain routers to act as VTEPs), in various other embodiments either the domain router acts as a VTEP and the external gateway does not or the external gateway acts as a VTEP and the domain router does not.

Figure 3:
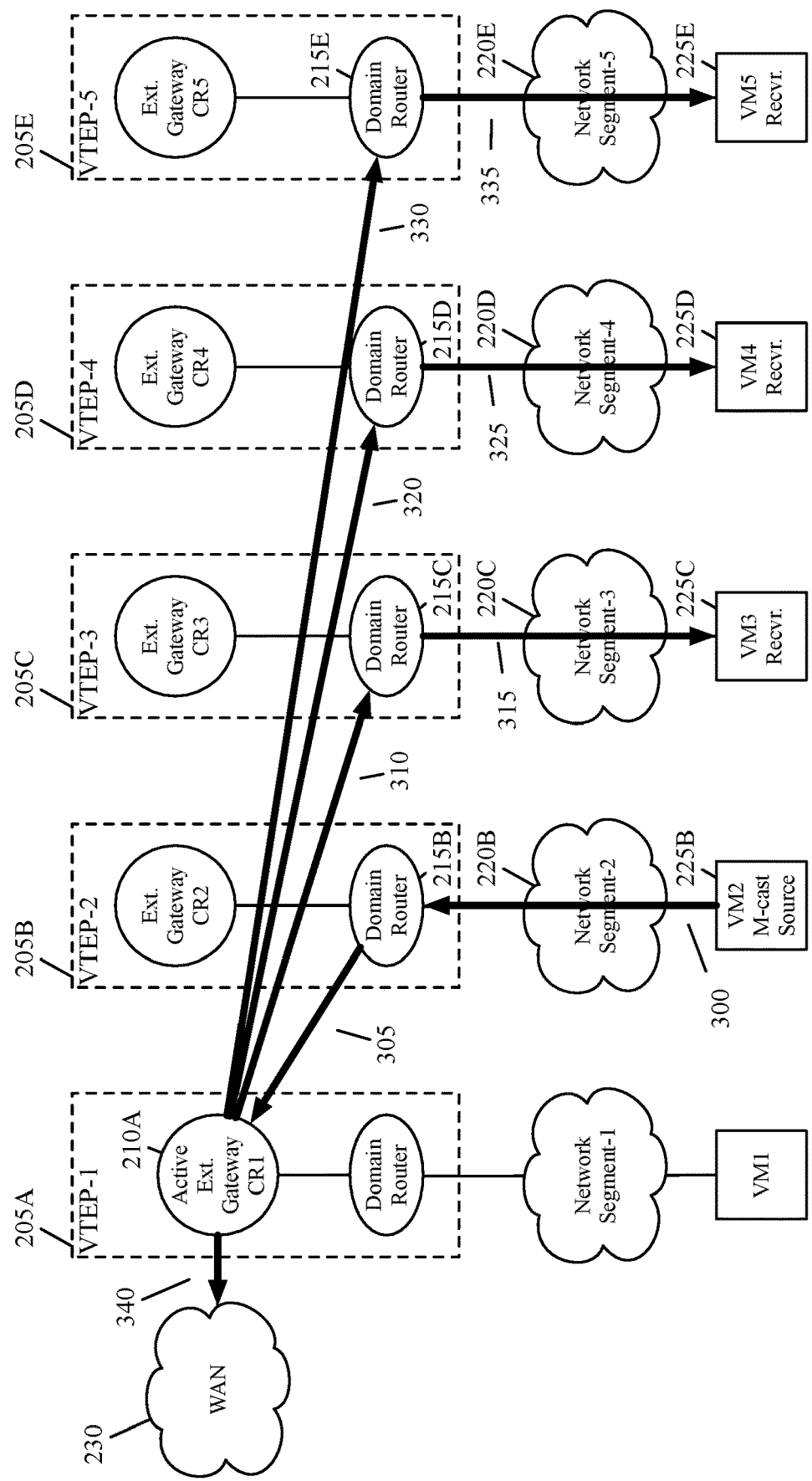
FIG. 3 conceptually illustrates a prior art multicast system.

As mentioned above, in the prior art, all multicast operations within a segmented logical network pass through the active external gateway CR. FIG. 3 conceptually illustrates a prior art multicast system. In this figure, multicast data 300 is sent from VM 225B, though network segment 220B, to domain router 215B. The multicast data 300 is then encapsulated using encapsulating data for VTEP-1 205A and the encapsulated multicast data stream 305 is then sent to active external gateway CR 210A. Active external gateway CR 210A sends unicast data 310 to domain router 215C encapsulated for VTEP-3 205C. The domain router 215C de-encapsulates the unicast data 310 and forwards the de-encapsulated data 315 to the receiver VM 225C. Similarly, active external gateway CR 210A sends unicast data 320 to domain router 215D encapsulated for VTEP-4 205D. The domain router 215D de-encapsulates the unicast data 320 and forwards the de-encapsulated data 325 to the receiver VM 225D. Again, for the last receiver, active external gateway CR 210A sends unicast data 330 to domain router 215E encapsulated for VTEP-5 205E. The domain router 215E de-encapsulates the unicast data 330 and forwards the de-encapsulated data 335 to the receiver VM 225E. In some prior art multicast systems, the active external gateway CR 210A also sends a copy 340 of the multicast data through the WAN 230 to a protocol independent multicast (PIM) core (not shown) for receivers (not shown) in the WAN 230.

Although the prior art system shown in FIG. 3 does provide multicasting, the burden on the active external gateway CR 210A is substantial, requiring that the CR 210A use (in the illustrated example) four times the outgoing bandwidth (data streams 310, 320, 330, and 340) as the bandwidth required to receive the incoming multicast data stream 305. One of ordinary skill in the art will understand that in cases with larger numbers of receivers in various network segments, the bandwidth needed to supply each receiver may exceed the outgoing bandwidth capacity of the active external gateway CR 210A. This becomes an even greater problem when machines in multiple network segments are multicasting data as all the multicast data from each network segment must be sent through a single active external gateway CR in the prior art system. An example of a novel system, of some embodiments, with multiple multicast sources is described with respect to FIG. 6, below.

Figure 4:
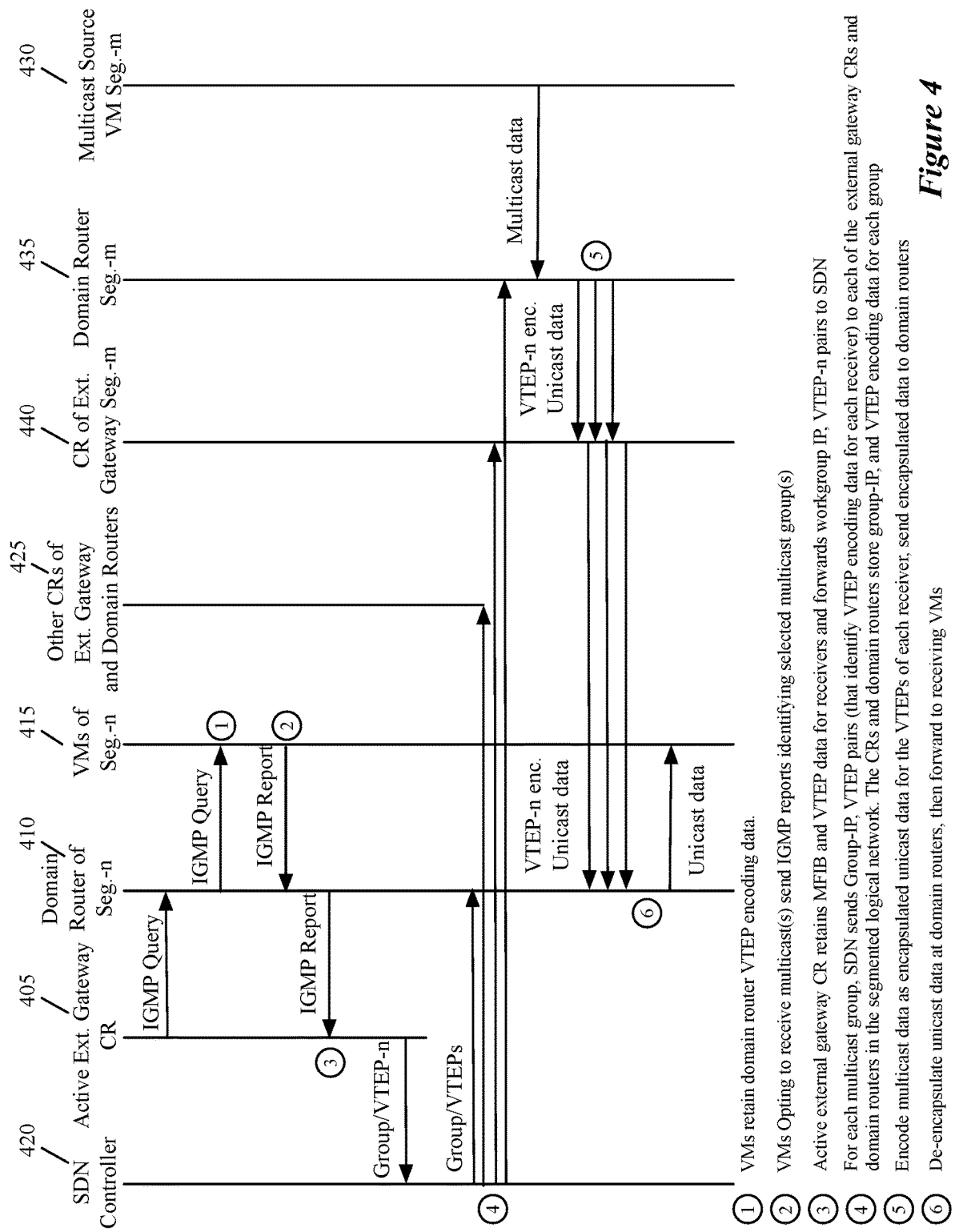
FIG. 4 conceptually illustrates a message diagram for multicasting data through an external gateway CR of a source network segment.

Accordingly, FIG. 4 conceptually illustrates a message diagram for multicasting data through an external gateway of a source network segment. FIG. 4 also includes identifiers of a number of operations taken by various machines, routers, and other network entities upon receiving or before sending out various messages to other network entities. These operations are not exhaustive, but are provided to elaborate on what various network entities are doing in response to the messages. Other embodiments may perform other or different operations or perform the operations in a different order.

The messaging in FIG. 4, for a particular workload-group-IP for a multicast, starts from the active external gateway CR 405 acting as an Internet Group Management Protocol (IGMP) querier and sending an IGMP query to the domain routers 410 of each network segment, which in turn pass the IGMP query on to the VMs 415 of their respective network segments. The IGMP query inquires whether a VM opts to receive a particular multicast. The VMs 415 retain the VTEP encoding data for the querier (active external gateway CR 405) as shown in operation 1. The VMs 415 that opt to receive a multicast (in operation 2) send an IGMP report through the domain router 410 of their network segment to the active external gateway CR 405.

The active external gateway CR 405 then stores MFIB data (in operation 3) to be used for routing the multicast data to the receivers. For each IGMP report-identified receiver, the active external gateway CR 405 sends a Workload-Group-IP, domain-router-VTEP pair to the SDN controller 420. The Workload-Group-IP, domain-router-VTEP pair specifies the IP address for that multicast group paired with the VTEP encoding information for the VTEP of the network segment of the particular receiver VM 415 that sent the corresponding IGMP report. The encoding information for a particular VTEP enables a router or gateway with that information to encapsulate data to be sent to that particular VTEP. The encapsulated data is thus secure against being read by unauthorized users during transmission and can be de-encapsulated when it reaches the particular VTEP.

The specific VM and network segment that will be the source of a particular multicast, in some embodiments, is not known at the time the SDN controller 420 receives some or all of the Workload-Group-IP, domain-router-VTEP pairs. Since the source VM and network segment are not necessarily known in advance, in some embodiments the method prepares the routers and gateways of all possible sources to encapsulate multicast data for the receivers. Accordingly, once the SDN controller 420 receives a set of Workload-Group-IP, domain-router-VTEP encoding information pairs, the SDN controller 420 sends (in operation 4) a list of these pairs to all external gateway CRs and domain routers, including the domain routers 410 of the receivers, and all external gateway CRs and domain routers 425, 435, and 440 of the network segments. This insures that, for whichever segment will eventually become the segment of the multicast source, the domain router 435 and external gateway CR 440 of that network segment will be able to encapsulate data for the VTEPs of the receivers. In some embodiments, sending VTEP encoding information to all gateway CRs and domain routers also allows those gateway CRs and domain routers to be substituted for the original gateway CR and domain router of the source network segment if the original gateway CR and/or domain router of the source segment crashes or otherwise fails.

Subsequently, when the multicast source VM 430 sends multicast data to the domain router 435, the domain router 435 uses (in operation 5) the Workload-Group-IP, domain-router-VTEP encoding information pairs to encapsulate the multicast data into unicast data for each of the receivers, using the VTEP encapsulation designated for the respective receivers' network segments. The domain router 435 of the network segment of the multicasting VM then sends the encapsulated unicast data through the external gateway CR 440 of the multicast source's network segment to the domain routers 410 of the network segments of each receiver VM. The domain routers 410 then de-encapsulate (in operation 6) the unicast data and forward the data to the VM(s) of that network segment that opted to receive the multicast.

Figure 5:
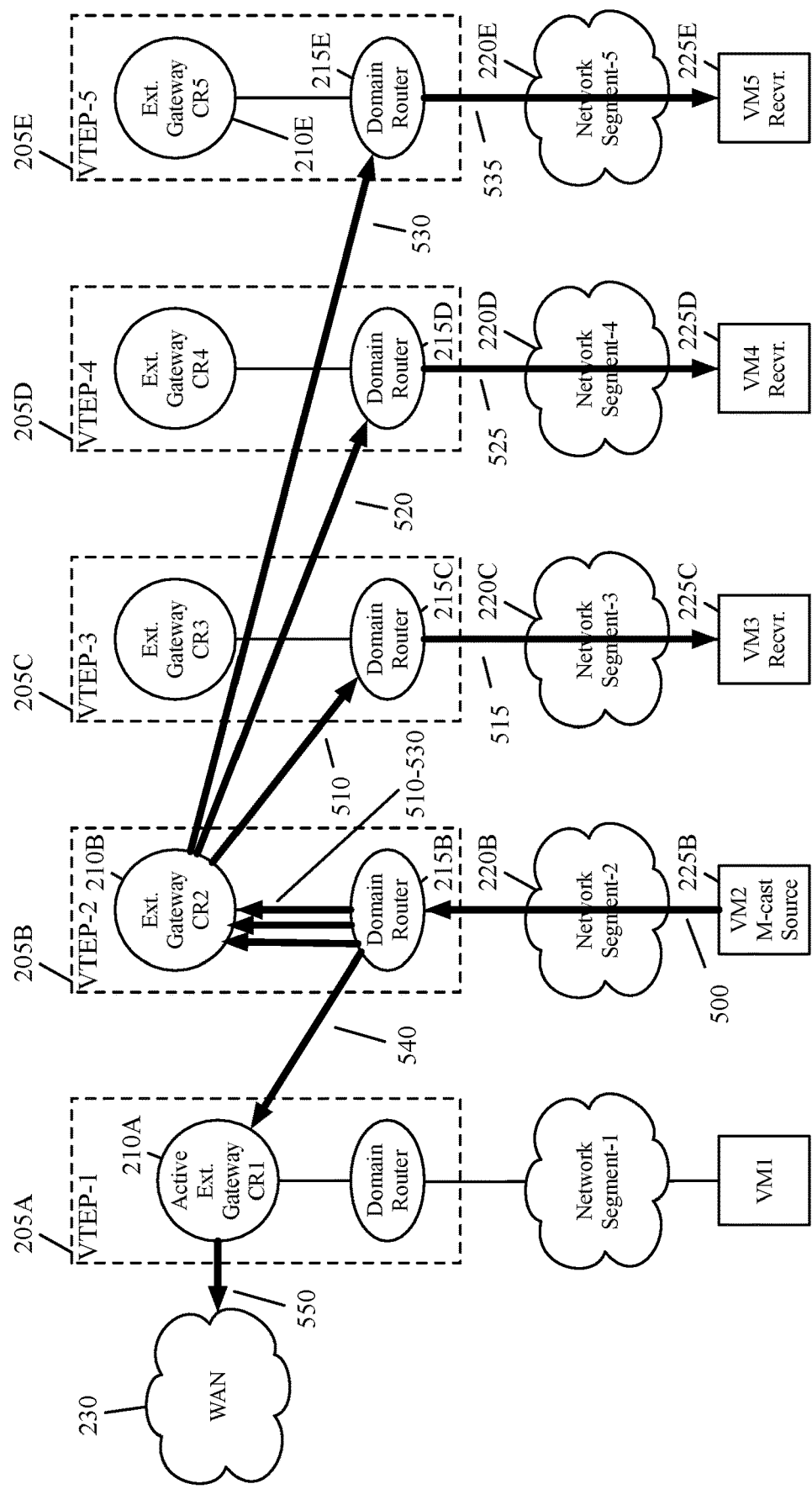
FIG. 5 illustrates the multicast system of some embodiments.

FIG. 5 illustrates the multicast system of some embodiments. A multicast source VM 225B sends multicast data 500 through network segment 220B to domain router 215B. The domain router 215B then encapsulates the data for each receiver VM's network segment and sends the encapsulated unicast data streams 510, 520, and 530 to the external gateway CR 210B of the network segment of the multicast source (in contrast to the prior art shown in FIG. 3, in which all encapsulation and sending of unicasts to the respective network segments was done at active external gateway CR 210A). The external gateway CR 210B of the multicast source network segment then sends unicasts 510, 520, and 530 to domain routers 215C, 215D, and 215E respectively.

The domain routers 215C, 215D, and 215E then each de-encapsulate the unicast data and respectively forward unicast data 515, 525, and 535 to the VM receivers 225C, 225D, and 225E.

In the embodiment of FIG. 5, the domain router 215B also sends a copy 540 of the multicast data to active external gateway CR 210A, which then sends a copy 550 of the multicast data through the WAN 230 to a protocol independent multicast (PIM) core (not shown) for receivers (not shown) in the WAN 230. As the active external gateway CR 210A, in the illustrated embodiment, only sends out one copy 550 of the data, the outgoing bandwidth usage matches the actual bandwidth usage of the multicast stream 540 rather than being a multiple of the bandwidth usage of the multicast stream 540, scaling with the number of receivers (as was the case in the prior art). In alternate embodiments, instead of being sent out on the WAN 230 as well as on the segmented logical network, the multicast may be confined to the network segments of the segmented logical network. Without sending the multicast data over the WAN 230, the role of the active external gateway CR 210A would be reduced to acting as a querier to set up each multicast without needing to use bandwidth for the multicast data itself.

Since the use of the active external gateway CR 210A to route the multicast data is reduced or eliminated, the present invention also has the advantage that multiple multicasts sent from separate source VMs, each in a different network segment, each result in bandwidth demands on separate external gateway CRs (the external gateway CRs of their respective network segments), meaning that no one external gateway CR is required to handle all the bandwidth for receiving multiple multicast data streams and unicasting them to other network segments. Thus the present invention distributes the workload to multiple CRs rather than placing the entire burden on, and possibly overloading, a single active external gateway CR.

As mentioned above, in the prior art system shown in FIG. 3, the burden on the active external gateway CR 210A is substantial as all multicast streams must be sent to the active external gateway CR 210A, which must then send out every unicast of that data to the network segments of every receiver. One of ordinary skill in the art will understand that in cases with larger numbers of receivers in various network segments, the bandwidth needed to supply each receiver may exceed the outgoing bandwidth capacity of the active external gateway CR 210A. This becomes an even greater problem when machines in multiple network segments are multicasting data as all the multicast data from each network segment must be sent through a single active external gateway CR in the prior art system.

Figure 6:
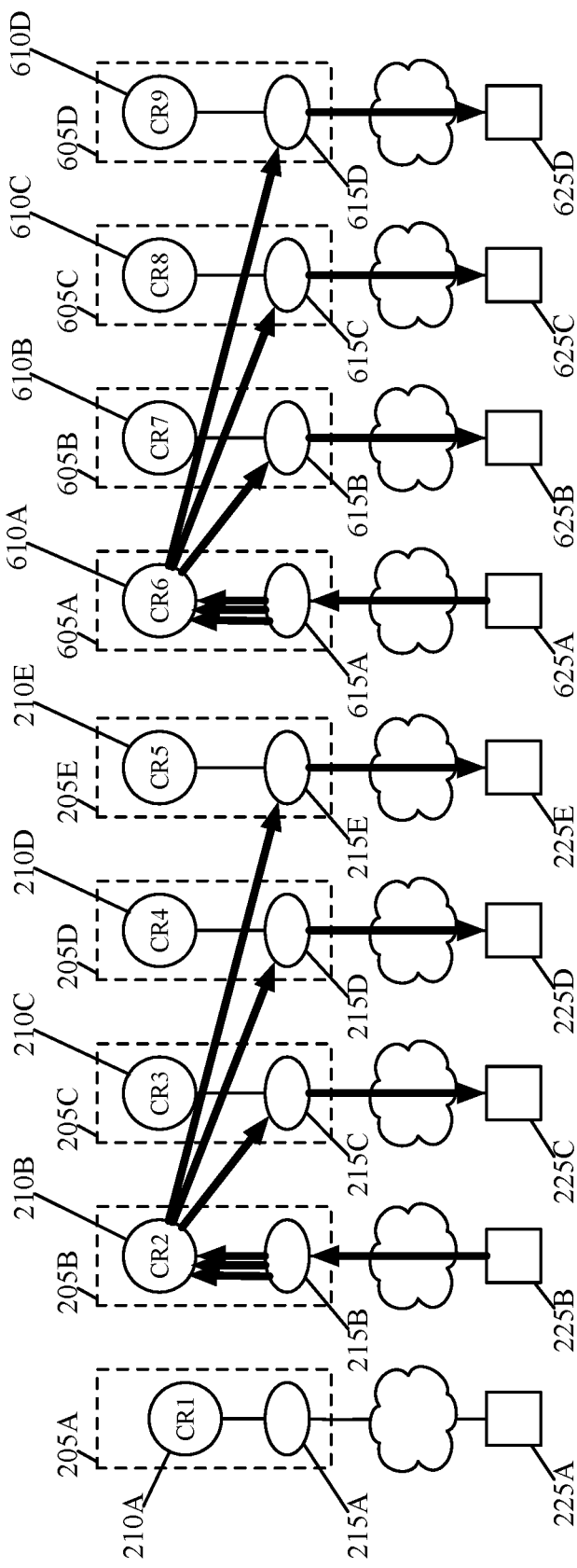
FIG. 6 illustrates the multicast system of some embodiments with multiple multicast sources.

FIG. 6 illustrates the multicast system of some embodiments with multiple multicast sources. FIG. 6 includes VTEPs 205A-205E and 605A-605D, active external gateway CR 210A, external gateway CRs 210B and 610A, domain routers 215A-215E and 615A-615D, and VMs 225A-225E and 625A-625D. VMs 225B and 625A are sources of multicast data. The multicast data from VM 225B is sent to the domain routers 215B where it is encapsulated as unicast data for each of the VTEPs 205C-205E of the receiver VMs 225C-225E. The unicasts are then sent to external gateway CR 210B and forwarded to the respective domain routers 215C-215E to be de-encapsulated and forwarded to the receiver VMs 225C-225E. Similarly, the multicast data from VM 625A is sent to the domain routers 615A where it is encapsulated as unicast data for each of the VTEPs 605B-605D of the receiver VMs 625B-625D. The unicasts are then sent to external gateway CR 610A and forwarded to the respective domain routers 615B-615D to be de-encapsulated and forwarded to the receiver VMs 625B-625D.

In a case where each multicast stream uses 2 Gbits/second and each external gateway CR 210A-210E and 610A-610D has an outgoing bandwidth of 10 Gbits/second, each of the external gateway CRs 210B and 610A uses 6 Gbits/second of that bandwidth to send out their respective three unicasts. Accordingly, neither external gateway CR 210B nor external gateway CR 610A has its available bandwidth saturated. This is in contrast to the prior art in which both multicasts would be sent to the active external gateway CR which would then be called upon to produce six unicasts of 2 Gbits/second each, for a total of 12 Gbits/second, which is beyond its available bandwidth, in this example. Thus, distributing the multicast to the separate external gateway CRs of the present invention allows the present method to multicast to receivers in more network segments than the prior art allows.

Although the above described embodiments include a single receiver or a single source VM in each network segment, one of ordinary skill in the art will understand that in some embodiments, multiple receivers and/or multiple sources may co-exist on the same network segments. In some such embodiments, one unicast is sent for each receiver, whether or not those receivers share a common network segment. However, in other embodiments, a single unicast is sent to each network segment with at least one receiver and the unicast is then distributed to all receiver VMs on that network segment (e.g., by the domain router).

Figure 7:
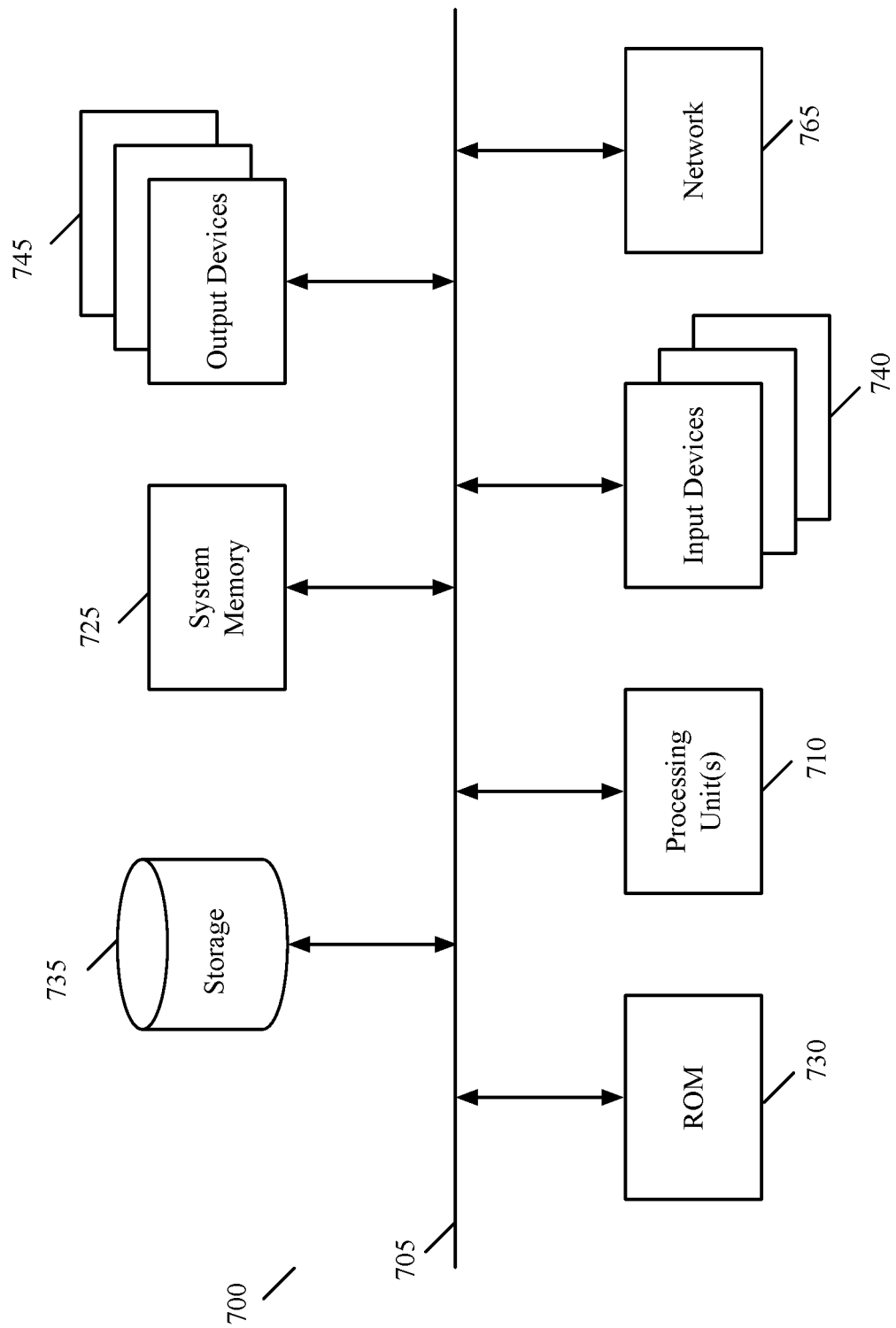
FIG. 7 conceptually illustrates an electronic system with which some embodiments of the invention are implemented.

FIG. 7 conceptually illustrates an electronic system 700 with which some embodiments of the invention are implemented. The electronic system 700 can be used to execute any of the control, virtualization, or operating system applications described above. The electronic system 700 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 700 includes a bus 705, processing unit(s) 710, a system memory 725, a read-only memory 730, a permanent storage device 735, input devices 740, and output devices 745.

The bus 705 collectively represents all system, peripheral, and chipset buses that communicatively connect the numerous internal devices of the electronic system 700. For instance, the bus 705 communicatively connects the processing unit(s) 710 with the read-only memory 730, the system memory 725, and the permanent storage device 735.

From these various memory units, the processing unit(s) 710 retrieve instructions to execute and data to process in order to execute the processes of the invention. The processing unit(s) may be a single processor or a multi-core processor in different embodiments.

The read-only-memory (ROM) 730 stores static data and instructions that are needed by the processing unit(s) 710 and other modules of the electronic system. The permanent storage device 735, on the other hand, is a read-and-write memory device. This device is a non-volatile memory unit that stores instructions and data even when the electronic system 700 is off. Some embodiments of the invention use a mass-storage device (such as a magnetic or optical disk and its corresponding disk drive) as the permanent storage device 735.

Other embodiments use a removable storage device (such as a floppy disk, flash drive, etc.) as the permanent storage device. Like the permanent storage device 735, the system memory 725 is a read-and-write memory device. However, unlike storage device 735, the system memory is a volatile read-and-write memory, such a random access memory. The system memory 725 stores some of the instructions and data that the processor needs at runtime. In some embodiments, the invention's processes are stored in the system memory 725, the permanent storage device 735, and/or the read-only memory 730. From these various memory units, the processing unit(s) 710 retrieve instructions to execute and data to process in order to execute the processes of some embodiments.

The bus 705 also connects to the input and output devices 740 and 745. The input devices 740 enable the user to communicate information and select commands to the electronic system. The input devices 740 include alphanumeric keyboards and pointing devices (also called "cursor control devices"). The output devices 745 display images generated by the electronic system 700. The output devices 745 include printers and display devices, such as cathode ray tubes (CRT) or liquid crystal displays (LCD). Some embodiments include devices such as a touchscreen that function as both input and output devices.

Finally, as shown in FIG. 7, bus 705 also couples electronic system 700 to a network 765 through a network adapter (not shown). In this manner, the computer can be a part of a network of computers (such as LAN, a WAN, an Intranet, or a network of networks, such as the Internet). Any or all components of electronic system 700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, are non-VM DCNs that include a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method of multicasting data in a logical network comprising a plurality of logical network segments each comprising a set of gateway routers, the method comprising:

configuring a first gateway router of a first network segment as an active gateway router to interface with an external network separate from the logical network;

configuring all other gateway routers of all other network segments as a standby gateway router for the logical network; and configuring each of at least a subset of standby gateway routers to forward multicast data originating from a source machine in the standby gateway router's logical network segment to other logical network segments that have at least one machine subscribed to receive the multicast data.

2. The method of claim 1 further comprising:

configuring the first gateway router to collect subscriptions to multicast data for different logical network segments for machines operating in the different logical network segments, and to provide the collected subscriptions to a controller; and configuring the controller to distribute subscriptions collected for each logical network segment to the gateway router of the logical network segment to use for subsequent forwarding of multicast data originating from machines in the gateway router's logical network segment.

3. The method of claim 2, wherein the first gateway router collects subscriptions by using Internet Group Management Protocol (IGMP) querying of the machines operating in the different logical network segments, and processing responsive IGMP reports from at least a subset of the machines operating in the different logical network segments.

4. The method of claim 1 further comprising configuring the active gateway router to forward to the external network multicast data from a set of the other network segments.

5. The method of claim 1, wherein the other gateway routers each comprise a centralized router of the logical network.

6. The method of claim 1, wherein the router of the first network segment receives encapsulation data for the sets of routers of the other network segments paired with an identifier of a particular multicast.

7. The method of claim 6, wherein the identifier of a particular multicast is a multicast-group-IP address.

8. The method of claim 6, wherein the multicast source machine of an other network segment is a virtual machine of the other network segment and the identifier is a first identifier, the method further comprising receiving, from the virtual machine, with the multicast data, a second identifier of the particular multicast to identify the multicast data as data of the particular multicast.

9. The method of claim 8, wherein the first identifier is received before the second identifier.

10. The method of claim 1, wherein the router of the network segment of each receiver is a domain router of the network segment of the receiver.

11. The method of claim 1, wherein each set of one or more logical gateway routers is a pair of routers.

12. A non-transitory machine readable device storing a program which when executed by at least one processing unit, multicasts data in a logical network comprising a plurality of logical network segments each comprising a set of gateway routers, the program comprising sets of instructions for:

configuring a first gateway router of a first network segment as an active gateway router to interface with an external network separate from the logical network;

configuring all other gateway routers of all other network segments as a standby gateway router for the logical network; and configuring each of at least a subset of standby gateway routers to forward multicast data originating from a source machine in the standby gateway router's logical network segment to other logical network segments that have at least one machine subscribed to receive the multicast data.

13. The non-transitory machine readable device of claim 12, wherein the program further comprises sets of instructions for:

configuring the first gateway router to collect subscriptions to multicast data for different logical network segments for machines operating in the different logical network segments, and to provide the collected subscriptions to a controller; and configuring the controller to distribute subscriptions collected for each logical network segment to the gateway router of the logical network segment to use for subsequent forwarding of multicast data originating from machines in the gateway router's logical network segment.

14. The non-transitory machine readable device of claim 13, wherein the first gateway router collects subscriptions by using Internet Group Management Protocol (IGMP) querying of the machines operating in the different logical network segments, and processing responsive IGMP reports from at least a subset of the machines operating in the different logical network segments.

15. The non-transitory machine readable device of claim 12, wherein the program further comprises sets of instructions for configuring the active gateway router to forward to the external network multicast data from a set of the other network segments.

16. The non-transitory machine readable device of claim 12, wherein the other gateway routers each comprise a centralized router of the logical network.

17. The non-transitory machine readable device of claim 12, wherein the router of the first network segment receives encapsulation data for the sets of routers of the other network segments paired with an identifier of a particular multicast.

18. The non-transitory machine readable device of claim 17, wherein the identifier of a particular multicast is a multicast-group-IP address.

19. The non-transitory machine readable device of claim 17, wherein the multicast source machine of an other network segment is a virtual machine of the other network segment and the identifier is a first identifier, the program further comprising a set of instructions for receiving, from the virtual machine, with the multicast data, a second identifier of the particular multicast to identify the multicast data as data of the particular multicast.

20. The non-transitory machine readable device of claim 19, wherein the first identifier is received before the second identifier.

* * * * *